United States Patent
Yang et al.

(10) Patent No.: US 11,601,936 B2
(45) Date of Patent: Mar. 7, 2023

(54) METHOD AND DEVICE FOR CONFIGURING SIDELINK RESOURCES

(71) Applicant: ZTE CORPORATION, Guangdong (CN)

(72) Inventors: Jin Yang, Guangdong (CN); Weimin Xing, Guangdong (CN); Youxiong Lu, Guangdong (CN)

(73) Assignee: ZTE CORPORATION

( * ) Notice: Subject to any disclaimer, the term of this patent is extended or adjusted under 35 U.S.C. 154(b) by 245 days.

(21) Appl. No.: 17/048,226

(22) PCT Filed: Apr. 12, 2019

(86) PCT No.: PCT/CN2019/082415
§ 371 (c)(1),
(2) Date: Oct. 16, 2020

(87) PCT Pub. No.: WO2019/201165
PCT Pub. Date: Oct. 24, 2019

(65) Prior Publication Data
US 2021/0176747 A1    Jun. 10, 2021

(30) Foreign Application Priority Data
Apr. 19, 2018 (CN) .......................... 201810354828.5

(51) Int. Cl.
*H04W 72/04* (2009.01)
*H04W 72/0446* (2023.01)

(52) U.S. Cl.
CPC ............................... *H04W 72/0446* (2013.01)

(58) Field of Classification Search
CPC ................................................ H04W 72/0446
See application file for complete search history.

(56) References Cited

U.S. PATENT DOCUMENTS

| | | | | |
|---|---|---|---|---|
| 2017/0339679 | A1* | 11/2017 | Lee | ........................ H04L 5/0048 |
| 2018/0249448 | A1* | 8/2018 | Yasukawa | ............. H04W 28/06 |
| 2019/0045345 | A1* | 2/2019 | Lee | ........................ H04L 5/0048 |
| 2020/0221271 | A1* | 7/2020 | Kim | .................... H04L 27/2601 |
| 2020/0252871 | A1* | 8/2020 | Chae | ................. H04W 52/0274 |
| 2020/0367185 | A1* | 11/2020 | Kim | .................... H04L 27/2607 |

(Continued)

FOREIGN PATENT DOCUMENTS

| | | |
|---|---|---|
| CN | 107683623 A | 2/2018 |
| CN | 107820273 A | 3/2018 |
| EP | 3444990 | 2/2019 |
| WO | 2014129357 | 8/2014 |
| WO | 2017026543 | 2/2017 |

(Continued)

OTHER PUBLICATIONS

Huawei, HiSilicon: "Discussion on resource pool sharing between mode3 and mode4 UEs," 3GPP Draft, R2-1801900, Athens, Greece, Feb. 26-Mar. 2, 2018.

(Continued)

*Primary Examiner* — Khaled M Kassim
(74) *Attorney, Agent, or Firm* — McDonald Hopkins LLC

(57) ABSTRACT

Disclosed is a method and device for configuring sidelink resources. The method includes: a network side indicates time domain resources of a sidelink resource pool used for sidelink communication, where the sidelink resource pool includes at least one slot in time domain, and a slot includes at least one time domain symbol, the time domain resources of the sidelink resource pool are dedicated resources of the sidelink communication, or resources shared by the sidelink communication and a cellular link. Further disclosed are a system for configuring resources, and a storage medium.

18 Claims, 6 Drawing Sheets

(56) References Cited

U.S. PATENT DOCUMENTS

2021/0329633 A1* 10/2021 Xing ................. H04W 72/0446
2022/0330241 A1* 10/2022 Zhao ..................... H04W 72/02

FOREIGN PATENT DOCUMENTS

| WO | 2017038509 | | 3/2017 |
|----|------------|----|--------|
| WO | 2017167401 | A1 | 10/2017 |
| WO | 2017196129 | | 11/2017 |
| WO | 2018029976 | | 2/2018 |
| WO | 2018030854 | | 2/2018 |

OTHER PUBLICATIONS

Japan Patent Office (JPO), Notification of Reasons for Refusal for Patent Application No. 2020-557930, drafted Jan. 11, 2022, Fourth Patent Examination Department, Japan.

English Translation of International Search Report dated Jun. 28, 2019; International Patent Application No. PCT/CN2019/082415 filed Apr. 12, 2019. ISA/CN.

VIVO. "UE Behaviors Related to SFI" 3GPP TSG RAN WG1 Meeting 90# Prague, P.R. Czechia Aug. 21-25, 2017 R1-1712851. Aug. 12, 2017 (Aug. 12, 2017), sections 1-3.

Intel Corporation: "Group-common PDCCH: Contents," 3GPP Draft, R1-1707385, May 15-19, 2017, China.

Motorola Mobility: "Introduction of Enhancements to LTE operation in unlicensed spectrum into 36.213 s 14xx," 3GPP Draft, R1-1804488, Apr. 16-20, 2018, China.

Extended European Search Report for Application 19788752.4, PCT/CN2019082415, dated Jan. 5, 2022, 10 pgs., European Patent Office, Germany.

Canadian Patent Office, Examination Search Report for Application No. 3,097,606 dated Oct. 25, 2021, Canada.

\* cited by examiner

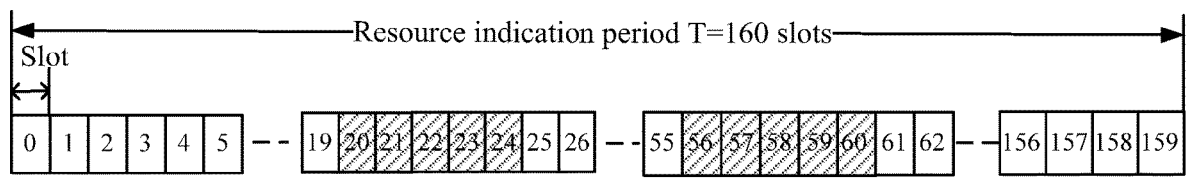
FIG. 4
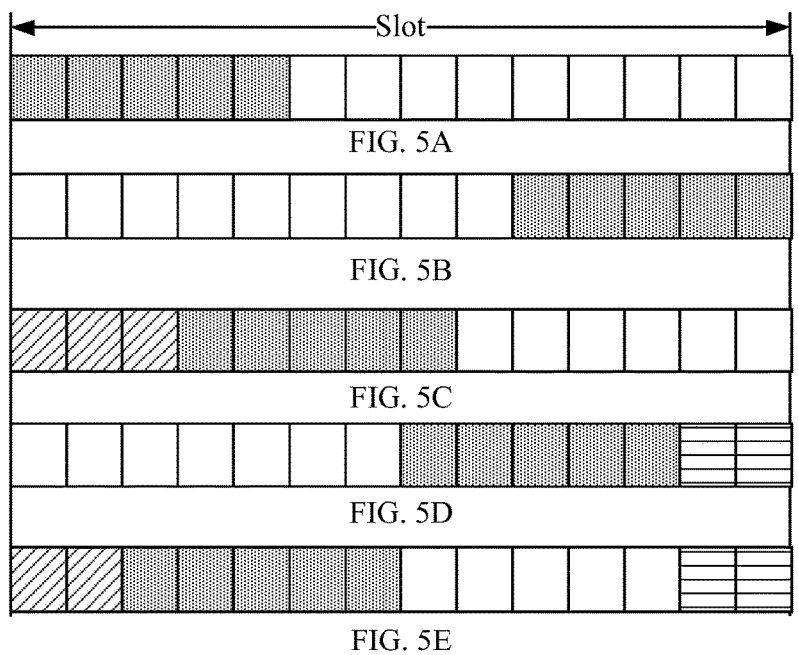
FIG. 5A
FIG. 5B
FIG. 5C
FIG. 5D
FIG. 5E

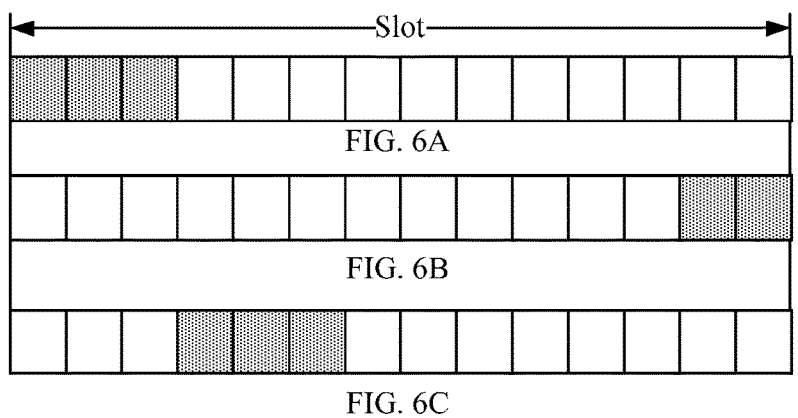
FIG. 6A
FIG. 6B
FIG. 6C
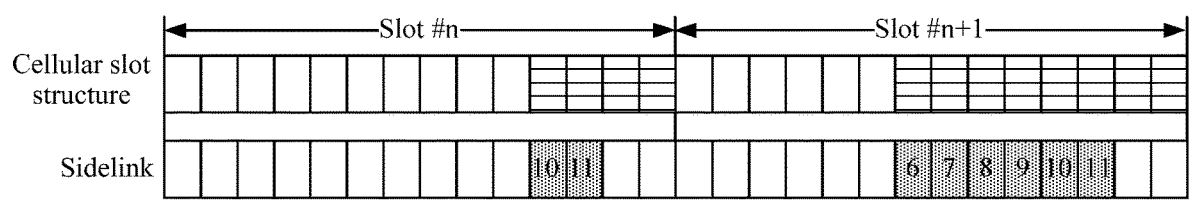
FIG. 7
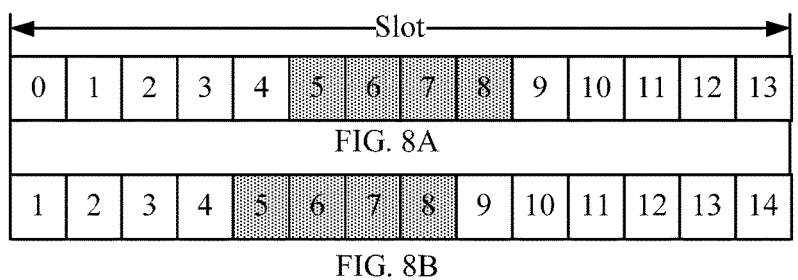
FIG. 8A
FIG. 8B

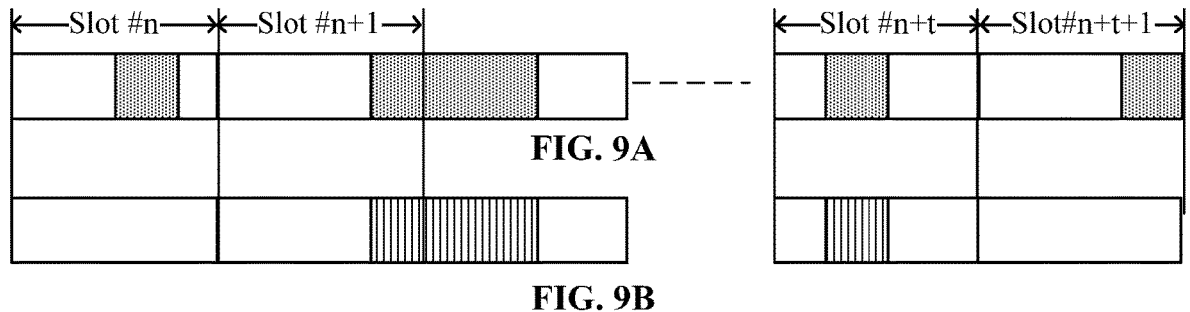
FIG. 9A
FIG. 9B
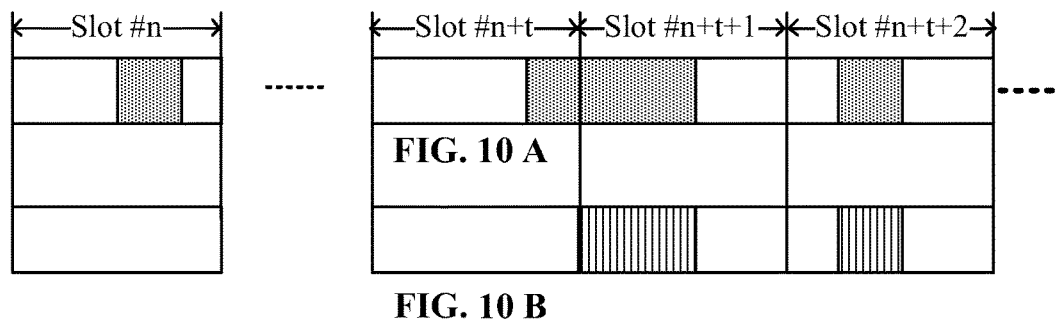
FIG. 10 A
FIG. 10 B
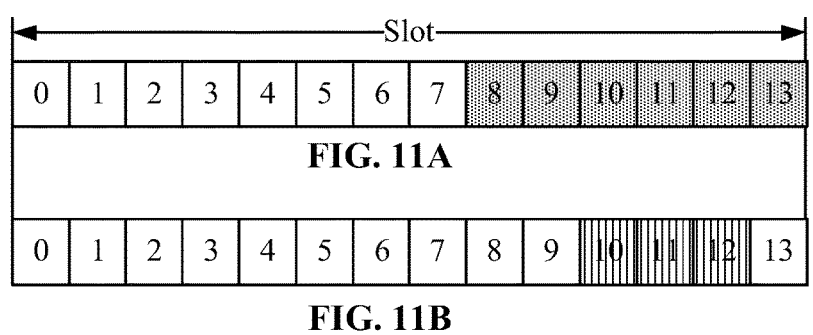
FIG. 11A
FIG. 11B

METHOD AND DEVICE FOR CONFIGURING SIDELINK RESOURCES

CROSS-REFERENCE TO RELATED APPLICATIONS

This is a National Stage Application, filed under 35 U.S.C. 371, of International Patent Application No. PCT/CN2019/082415, filed on Apr. 12, 2019, which claims the priority of Chinese patent application filed to the Chinese Patent Office with application No. 201810354828.5 on Apr. 19, 2018, disclosures of which are incorporated herein by reference in their entireties.

TECHNICAL FIELD

The present application relates to, but is not limited to, next generation communication technologies, and in particular to a method and device for configuring sidelink resources.

BACKGROUND

With the development of wireless communication technologies and the increasing requirements of users for communications, in order to meet higher, faster and newer communication requirements, 5th generation (5G) mobile communication technologies have become a trend of future network developments.

In a sidelink communication system, when there are services to be transmitted between user equipments (UEs), service data between the UEs is directly transmitted to a target UE by a data source UE through a sidelink instead of being forwarded through the network side, i.e., instead of being forwarded through the cellular link between the UE and the base station. FIG. 1 is a schematic diagram of a sidelink communication structure in the related art. As shown in FIG. 1, the mode of direct communications between the UEs has characteristics obviously different from a communication mode of a traditional cellular system. For a near field communication user capable of applying the sidelink communication, the sidelink communication not only saves wireless spectrum resources, but also reduces data transmission pressure of the core network, so that less system resources are occupied, the spectrum efficiency of the cellular communication system is increased, the sending power consumption of a terminal is reduced, and the network operation cost is saved to a great extent.

In a 5G communication system, due to a fact that a finer resource granularity and a more flexible scheduling indication manner are adopted, a resource definition and management manner of the sidelink communication in the related art cannot be suitable for the 5G system, and therefore the sidelink communication cannot be carried out between the UEs in the 5G system.

SUMMARY

The present application provides a method, device and system for configuring sidelink resources, which can provide guarantee for realizing sidelink communication in a next generation communication system.

The present application provides a method for configuring sidelink resources. The method includes steps described below, a network side indicates time domain resources of a sidelink resource pool used for sidelink communication. The sidelink resource pool includes at least one slot in time domain, and at least one time domain symbol in a slot is used for the sidelink communication. The time domain resources of the sidelink resource pool are dedicated resources of the sidelink communication, or shared by the sidelink communication and a cellular link.

The present application further provides a computer-readable storage medium. The computer-readable storage medium stores a computer-executable instruction used for performing the method for configuring the sidelink resources described in the above embodiment.

The present application further provides a device for configuring resources. The device includes a processor, a memory, and a computer program stored on the memory and executable on the processor. The computer program, when executed, implements the method for configuring the sidelink resources described in the above embodiments.

The present application further provides a method for configuring sidelink resources. The method includes steps described below, a user equipment (UE) determines, according to resource configuration of the sidelink resource pool, time domain resources of a sidelink resource pool used for sidelink communication. The sidelink resource pool includes at least one slot in time domain, and at least one time domain symbol in a slot is used for the sidelink communication. The time domain resources of the sidelink resource pool are dedicated resources of the sidelink communication, or shared by the sidelink communication and a cellular link.

The present application further provides a computer-readable storage medium. The computer-readable storage medium stores a computer-executable instruction used for performing the method for configuring the sidelink resources described in any one of the above embodiments.

The present application further provides a device for configuring resources. The device includes a processor, a memory, and a computer program stored on the memory and executable on the processor. The computer program, when executed, implements the method for configuring the sidelink resources described in any one of the above embodiments.

The present application further provides a device for configuring sidelink resources. The device includes a configuration module and a sending module. The configuration module is configured to configure time domain resources of sidelink resource pool used for sidelink communication, where the sidelink resource pool includes at least one slot in time domain, and at least one time domain symbol in a slot is used for the sidelink communication; and the time domain resources of the sidelink resource pool are dedicated resources of the sidelink communication, or shared by the sidelink communication and a cellular link. The sending module is configured to send, to a user equipment, resource configuration of the time domain resources of the sidelink resource pool used for the sidelink communication.

The present application further provides another device for configuring sidelink resources. The device includes a receiving module and a processing module. The receiving module is configured to receive resource configuration of time domain resources of a sidelink resource pool used for sidelink communication, where the sidelink resource pool includes at least one slot in time domain, and at least one time domain symbol in a slot is used for the sidelink communication; and the time domain resources of the sidelink resource pool are dedicated resources of the sidelink communication, or shared by the sidelink communication and a cellular link. The processing module is configured to determine the time domain resources for the sidelink communication according to the resource configuration.

The present application further provides a system for configuring resources. The system includes a network side and a user equipment. The network side includes the device for configuring the sidelink resources described above. The user equipment includes another device for configuring the sidelink resources described above.

BRIEF DESCRIPTION OF DRAWINGS

The drawings described here are used to provide a further understanding of the present application and constitute a part of the present application. The exemplary embodiments of the present application and descriptions thereof are used to explain the present application and do not constitute an improper limitation of the present application. In the drawings:

FIG. 4 is a schematic diagram of an embodiment for implementing a slot indication in a configuration of the sidelink resource pool of the present application;

FIG. 5A is a schematic diagram of a first embodiment of an indication meaning of a quantity n of sidelink symbols in a slot in a method for configuring sidelink resources of the present application;

FIG. 5B is a schematic diagram of a second embodiment of an indication meaning of a quantity n of sidelink symbols in a slot in a method for configuring sidelink resources of the present application;

FIG. 5C is a schematic diagram of a third embodiment of an indication meaning of a quantity n of sidelink symbols in a slot in a method for configuring sidelink resources of the present application;

FIG. 5D is a schematic diagram of a fourth embodiment of an indication meaning of a quantity n of sidelink symbols in a slot in a method for configuring sidelink resources of the present application;

FIG. 5E is a schematic diagram of a fifth embodiment of an indication meaning of a quantity n of sidelink symbols in a slot in a method for configuring sidelink resources of the present application;

FIG. 6A is a schematic diagram of a first embodiment of using an SFI to indicate sidelink symbols in a method for configuring sidelink resources of the present application;

FIG. 6B is a schematic diagram of a second embodiment of using an SFI to indicate sidelink symbols in a method for configuring sidelink resources of the present application;

FIG. 6C is a schematic diagram of a third embodiment of using an SFI to indicate sidelink symbols in a method for configuring sidelink resources of the present application;

FIG. 7 is a schematic diagram of a fourth embodiment of using an SFI to indicate sidelink symbols in a method for configuring sidelink resources of the present application;

FIG. 8A is a schematic diagram of a first embodiment of an indication meaning of a quantity n of sidelink symbols and a starting symbol #k in a method for configuring sidelink resources of the present application;

FIG. 8B is a schematic diagram of a second embodiment of an indication meaning of a quantity n of sidelink symbols and a starting symbol #k in a method for configuring sidelink resources of the present application;

FIG. 9A is a schematic diagram of a first embodiment of an implementation of sidelink trigger indication information in a method for configuring sidelink resource pools of the present application;

FIG. 9B is a schematic diagram of a second embodiment of an implementation of sidelink trigger indication information in a method for configuring sidelink resources of the present application;

FIG. 10A is a schematic diagram of a third embodiment of an implementation of sidelink trigger indication information in a method for configuring sidelink resources of the present application;

FIG. 10B is a schematic diagram of a fourth embodiment of an implementation of sidelink trigger indication information in a method for configuring sidelink resources of the present application;

FIG. 11A is a schematic diagram of a fifth embodiment of an implementation of sidelink trigger indication information in a method for configuring sidelink resources of the present application;

FIG. 11B is a schematic diagram of a sixth embodiment of an implementation of sidelink trigger indication information in a method for configuring sidelink resources of the present application;

DETAILED DESCRIPTION

Figure 1:
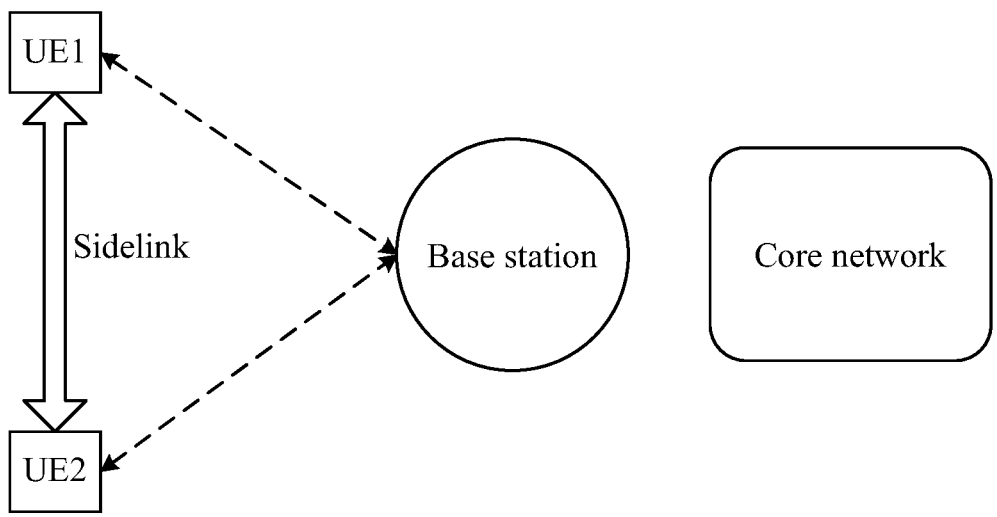
FIG. 1 is a schematic diagram of a sidelink communication structure in the related art.

In order to make purposes, technical schemes, and advantages of the present application more clearer, embodiments of the present application will be described in detail below in conjunction with the accompanying drawings. It should be noted that the embodiments of the present application and the features of the embodiments may be combined with each other arbitrarily in a case of no conflict.

In a sidelink communication system, the sidelink resource is used to transmit information between UEs. According to application scenarios, service types, etc., a sidelink communication manner includes but is not limited to device to device (D2D) communication, vehicle to vehicle (V2V) communication, etc. In the sidelink communication of the related art, the UE uses resources in a sidelink resource pool to send a sidelink signal. The sidelink resource pool includes: the physical sidelink control channel (PSCCH) resource pool used for carrying sidelink control information, the physical sidelink shared channel (PSSCH) resource pool used for carrying sidelink data service information, the physical sidelink broadcast channel (PSBCH) resource pool used for carrying sidelink broadcast information, and the physical sidelink discovery channel (PSDCH) resource pool used for carrying the sidelink discovery signal.

Generally, according to scenario requirements, a network side configures a sidelink resource pool for sidelink UE, or the sidelink resource pool is pre-configured by a system, and the UE carries sidelink information using resource(s) in the sidelink resource pool. Any one or more of multiple types of the sidelink resource pools described above may be configured for the sidelink UE in network side configuration or system predefined configuration. The system may be a wireless communication network system, which may be considered here as being determined by a higher-level node, and the sidelink resource pool is a set of predefined and configured resources.

When the UE performs information interaction on the sidelink, a transmitting UE sends sidelink control information (SCI) on PSCCH resources, and indicates, to a receiving UE, the PSSCH resource used for sidelink data information and related control information, such as the modulation and coding scheme (MCS), a power control indication, a data retransmission indication. Further, the transmitting UE sends sidelink data on PSSCH resource indicated by the SCI. In addition, the UE may also send the sidelink broadcast information on PSBCH resource, and send sidelink discovery information on PSDCH resource.

In order to implement sidelink communication in a next generation (New Radio, NR) communication system, this application provides a method for configuring resources. The method includes steps described below.

A network side indicates time domain resources of a sidelink resource pool used for sidelink communication, where the sidelink resource pool includes at least one slot in time domain, at least one time domain symbol in a slot is used for the sidelink communication, and the indicated time domain symbol is also referred to as a sidelink symbol.

The time domain resources of the sidelink resource pool are dedicated resources of the sidelink communication, or shared by the sidelink communication and cellular link.

For the corresponding UE side, the method includes steps described below, the UE determines the time domain resources of the sidelink resource pool, used for the sidelink communication, according to resource configuration of the sidelink resource pool. The sidelink resource pool includes at least one slot in time domain, and at least one time domain symbol in the at least slot is used for the sidelink communication. The time domain resources of the sidelink resource pool are dedicated resources of the sidelink communication, or resources shared by the sidelink communication and the cellular link.

Alternatively, entities on the network side may include, but are not limited to, an evolved Node B (eNB), a relay node (RN), a multi-cell coordination entity (MCE), a gateway (GW), a mobility management entity (MME), an evolved universal terrestrial radio access network (EU-TRAN) operation administration and maintenance (OAM) manager, etc. For convenience, the present application takes a base station as an example for description.

In a 5G communication system, a minimum granularity of the time domain resources is a symbol, which may be divided into the cyclic prefix (CP) orthogonal frequency division multiplex (OFDM) symbol (CP-OFDM), or the discrete Fourier transform spread OFDM symbol (DFT-S-OFDM).

Figure 2:
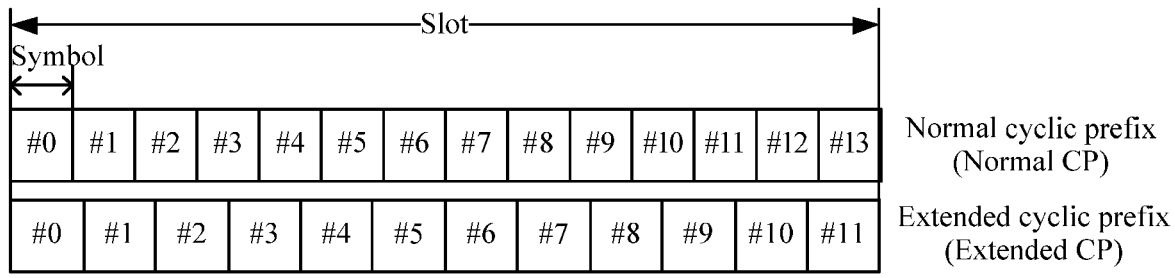
FIG. 2 is a schematic diagram showing a slot in a 5G system.

Further, one slot includes continuous symbols of 12 extend cyclic prefixes (extend CPs) or 14 normal cyclic prefixes (normal CPs), as shown in FIG. 2. Alternatively, a mini-slot may be composed of one or more continuous symbols (less than or equal to 7 symbols). In frequency domain, a minimum granularity of the resource is a sub-carrier. According to different system configurations, each sub-carrier includes different frequency domain widths, which include any one or more of 15 kHz, 30 kHz, 60 kHz, 120 kHz or 240 kHz. One frequency domain resource block (RB) may be composed of 12 continuous sub-carriers. As described above, one of the symbol, the slot or the mini-slot is a resource unit of time domain resource configuration in a 5G system, and the RB is a resource unit of frequency domain resource configuration, herein, the sidelink resource configuration is implemented by using this as a basic unit.

Figure 3:
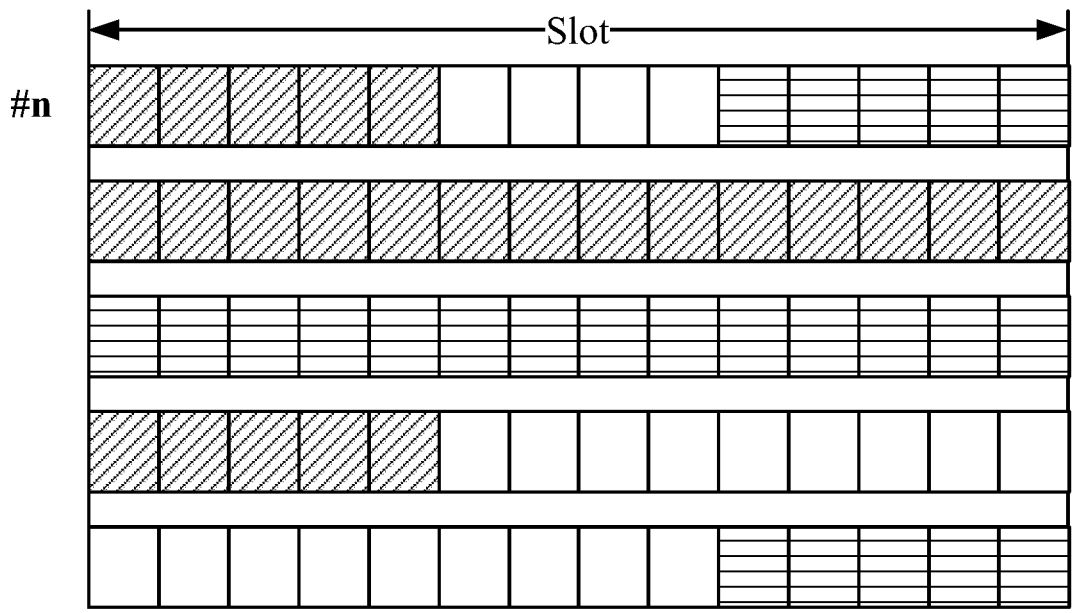
FIG. 3 is a schematic diagram of symbol type configuration in a slot in a 5G system according to an embodiment.

In the 5G system, the base station indicates, for a cellular link UE, time domain and frequency domain resource configuration for cellular communication, including symbols, slot division and a type of each symbol in time domain; and a sub-carrier and RB division in frequency domain. In time domain, there are three symbol types: a downlink symbol (DL symbol), an uplink symbol (UL symbol), and a flexible symbol (X symbol). Each symbol in each slot may be configured as any one of the three symbol types described above. As the example shown in FIG. 3, slot #n contains 5 DL symbols (as shown by the slanted shaded small squares in FIG. 3), 5 UL symbols (as shown by the transverse shaded small squares in FIG. 3), and 4 flexible symbols (as shown by the blank small squares in FIG. 3). The DL symbol is used for carrying the downlink signal, namely a signal sent to the UE from the base station; the UL symbol is used for carrying the uplink signal, namely a signal sent by the UE to the base station; and the flexible symbol is a flexible reconfigurable symbol, that is, an X symbol may be further reconfigured as the DL symbol or the UL symbol. Moreover, a symbol that has been configured as the DL symbol or the UL symbol is not able to change the symbol type. The symbol type and position in each slot are indicated and configured by the system through signaling. Other configurations of symbols in the slot are shown in FIG. 3, which will not be repeated here.

Alternatively, a sidelink resource pool is a set of resources for carrying the sidelink information or signal, and is configured by the network side through physical layer and/or higher layer signaling, or pre-configured by the system. Each sidelink resource pool may contain one or more time domain resource units in time domain, and the one or more time domain resource units include any one or more of a symbol, a slot or a mini-slot. One or more RBs are included in frequency domain, and the included multiple RBs may be continuous or discontinuous. Each of the PSCCH resource pool, the PSSCH resource pool, the PSBCH resource pool and the PSDCH resource pool is one type of the sidelink resource pool, and a manner for configuring and indicating the sidelink resource pool in this application may be applied to the configuration of any one or more resource pools described above.

When resources of the sidelink resource pool share cellular communication time domain and frequency domain resource, a configuration needs to be performed on the basis of existing time domain and frequency domain resources in the cellular link. For example, the time domain resources in a sidelink resource pool are further configured on the basis of the symbol, the slot division, and the symbol type which are already indicated on the cellular link.

Since the UE may keep the cellular communication and the sidelink communication at the same time, the configuration of the sidelink resource pool needs to avoid conflicts with cellular communication resources as much as possible, that is, the time domain resource and the frequency domain resource contained in the sidelink resource pool should not affect the resource configuration of the cellular link as much as possible. In a new generation communication system, such as a 5G system, a UE that performs the cellular communication within a cell may determine the symbol type for each symbol in each slot in time domain by receiving corresponding configuration signaling of the network side node (such as a base station). Further, according to scheduling indication of the base station, the UE receives or sends signal by using symbols of the corresponding symbol type.

It should also be noted that since signals for the sidelink communication are sent by the UE and received by other surrounding UEs that support the sidelink communication. In order to avoid interference from cellular downlink signals, the UL symbol and/or the flexible symbol should be used in the sidelink resource pool, while the usage of the DL symbol is avoided. The UL symbol or the flexible symbol refers to a UL symbol or a flexible symbol configured for the cellular link by the base station in the cellular communication.

Moreover, since the configuration of the sidelink resource pool cannot conflict with the resource configuration of a cellular network user, in the configuration of the sidelink resource pool, the indicated resource used for the sidelink communication does not contain at least the DL symbol in time domain, i.e., the symbol indicated in a sidelink resource pool contains the UL symbol and/or the flexible symbol.

In one embodiment, in the method for configuring the resources in the present application, the step in which the time domain resource, used for the sidelink communication, of a sidelink resource pool is indicated includes one of following steps.

A slot index of slot(s) used for sidelink communication within a resource indication period T is indicated; where the time domain resources of a sidelink resource pool are at least one time domain symbol in a slot corresponding to the indicated slot index; or At least one slot within the resource indication period T is indicated by using a bitmap, where a valid bit of the bitmap represents a corresponding slot, at least one time domain symbol in the corresponding slot is used as the time domain resources of the sidelink resource pool.

Alternatively, the resource indication period T may be: the period of a configuration of a cell common resource indicated by the base station, which represents a time domain resource configuration period of a cellular communication cell, alternatively, the resource indication period T may also be a period of the sidelink resource pool, or be a dedicated configuration period for configuring the sidelink resource pool, which represents a repetition time interval of the configuration the sidelink resource pool.

Alternatively, the period of the sidelink resource pool may be different from the resource configuration period of the cellular cell.

When the period of the sidelink resource pool is configured, the slot index indicated above may be a sequential serial number of multiple slots contained in the period of the sidelink resource pool.

In time domain, using the slot as a basic unit, the indication period T containing N slots, e.g., the period is 40 slots, 80 slots, 160 slots, 320 slots, etc. In each period, each slot may be sequentially numbered and determined with a slot index. For example, the slot index corresponding to a first slot within one period is equal to 0, the slot index corresponding to a second slot is equal to 1, and so on, until the slot index is equal to N−1. N is an integer greater than or equal to 1.

In this embodiment, when the base station indicates the sidelink resource pool, the base station indicates slot index corresponding to one or more slots contained in the sidelink resource pool. A slot corresponding to the indicated slot index is represented that in time domain, a part of or all symbols in this slot may be used for the sidelink communication. An indication for one or more slots contained in the sidelink resource pool may be used for indicating the slot index of each configured slot one by one in sequence; or the configured slot may also be indicated in a bitmap manner. A length of the bitmap is the quantity N of slots contained in the indication period T, for example, when a corresponding indication bit in the bitmap is "1", i.e., the corresponding bit of "1" is defined as a valid indication, which represents that the slot corresponding to this bit is contained in the sidelink resource pool, and conversely, the corresponding indication bit of "0" is defined in the same way.

For the corresponding UE side, alternatively, the step in which the UE determines the time domain resources of a sidelink resource pool, used for the sidelink communication, according to the resource configuration of the sidelink resource pool includes steps described below.

When the resource configuration of the sidelink resource pool indicates the slot index within the resource indication period, according to the slot index, the UE determines at least one time domain symbol in each slot corresponding to the slot index as the time domain resources of the sidelink resource pool within the resource indication period T; or when the resource configuration of the sidelink resource pool indicates the slot within the resource indication period by using a bitmap, according to the bitmap, the UE determines at least one time domain symbol in each slot corresponding to a valid bit of the bitmap as the time domain resources of the sidelink resource pool within the resource indication period.

Alternatively, a pre-configuration manner is adopted to determine whether all or a part of the symbols in a slot indicated by the slot index are used for the sidelink communication. For example, all symbols in a slot indicated by the system is predefined to be used for the sidelink communication; or, it is predefined that a part of the symbols in the indicated sidelink slot may be used for the sidelink communication, and a quantity of symbols and positions of the symbols, which are available in each slot, may be predefined, for example, last 4 symbols in each slot are predefined as the time domain resources used for the sidelink communication.

Alternatively, according to the predefinition, UE determines the part or all of the symbols in a slot corresponding to the slot index are the sidelink symbols within the resource indication period T.

For example, it is assumed that the UE obtains, from the received resource configuration, an indication period T=160 slot, slot index=[20, 21, 22, 23, 24, 56, 57, 58, 59, 60]. Then, the UE may determine that slots 20, 21, 22, 23, 24, 56, 57, 58, 59, and 60 within each indication period T are time domain resources used for the sidelink communication, as shown by the slanted shaded small squares in FIG. 4.

Alternatively, the method for configuring the resources in this embodiment further includes steps described below.

In a slot contained in the sidelink resource pool, sidelink symbols, namely time domain symbols used for the sidelink communication, are indicated; or sidelink symbols in a slot contained in the sidelink resource pool is predefined, which includes predefining a quantity of the sidelink symbols and a position of the sidelink symbols in the slot.

For the corresponding UE side, the method further includes steps described below, according to the indicated sidelink symbols used for the sidelink communication, the UE determines these sidelink symbols as the time domain resources used for the sidelink communication.

Alternatively, no additional indication is required when all symbols in the indicated slot are served as the sidelink resources; when a part of the symbols in the indicated slot are served as the sidelink resource, positions of the symbols used for the sidelink communication should be indicated.

Alternatively, indicating sidelink symbol(s) in a slot which contained in a sidelink resource pool includes that: indicating the quantity n of the symbol(s) in a slot, where n is a positive integer.

Further, the quantity n of the sidelink symbols represents one of that:

n continuous symbols beginning with a starting symbol of a slot are the sidelink symbols, or n continuous symbols counting in reverse from a last symbol of a slot are the sidelink symbols; or when a part of symbols in a slot are configured as downlink symbols, the quantity n of the sidelink symbols represents that n continuous symbols beginning with a first symbol after a last downlink symbol in the slot are the sidelink symbols; or when a part of symbols in a slot are configured as uplink symbols, the quantity n of the sidelink symbols represents that n continuous symbols counting in reverse from one symbol before a first uplink symbol in the slot are the sidelink symbols; or when a part of symbols in a slot are configured as flexible symbols, the quantity n of the sidelink symbols represents that n continuous symbols beginning with a first flexible symbol in the slot are used for the sidelink communication, or n continuous symbols counting in reverse from a last flexible symbol are the sidelink symbols.

Alternatively, indicating sidelink symbol(s) in a slot which contained in a sidelink resource pool includes: indicating the sidelink symbol(s) based on a slot format indication (SFI).

For a UE, the step in which the UE determines the sidelink symbol(s) according to the SFI includes steps described below, In a slot corresponding to the SFI, UE determines that the sidelink symbol is the symbol which is indicated as preconfigured symbol type according to the SFI; where the preconfigured symbol type includes one of the following types: the downlink symbol, the uplink symbol, and the flexible symbol.

Further, the sidelink symbol(s) is indicated based on the SFI includes steps described below, A symbol, which is indicated as the preconfigured symbol type according to the SFI in a slot, is served as the sidelink symbol; or In a slot corresponding to the SFI, a symbol, which is both indicated as a first symbol type according to the SFI and configured as a second symbol type on the cellular link, is served as the sidelink symbol.

For a UE, UE determines the sidelink symbol(s) according to the SFI includes steps described below, In a slot corresponding to the SFI, the UE determines that the sidelink symbol is the symbol, which is indicated as a first symbol type according to the SFI and is configured as a second symbol type on the cellular link.

Alternatively, the first symbol type is predefined by a system and is a designated symbol type in the SFI used for indicating the sidelink resource; and the second symbol type is predefined by the system and is a designated symbol type indicated by a network side configuration in a cellular link resource configuration.

Alternatively, a symbol of the designated symbol type includes one of the following types: the downlink symbol, the uplink symbol, or the flexible symbol; and the first symbol type and the second symbol type are a same symbol type or different symbol types.

Alternatively, indicating the sidelink symbols in a slot contained in a sidelink resource pool includes: indicating a quantity n of sidelink symbol(s) in a slot and a starting symbol #k.

Further, an indication meaning of the quantity n of the sidelink symbol(s) and the starting symbol #k includes that n continuous symbols beginning with the starting symbol #k in a slot are the sidelink symbols.

Alternatively, indicating sidelink symbols in a slot contained in a sidelink resource pool includes: indicating a quantity m of symbols in a slot, which are not used for the sidelink communication, where the quantity m of the symbols is a non-negative integer.

Further, an indication meaning of the quantity m of the symbols includes one of that: m continuous symbols beginning with a starting symbol of the slot are not used for the sidelink communication, or m continuous symbols counting in reverse from a last symbol of the slot are not used for the sidelink communication; or when a part of symbols in the slot are configured as downlink symbols, the quantity m of the symbols represents that m continuous symbols beginning with a first symbol after a last downlink symbol in the slot are not used for the sidelink communication; or when a part of symbols in the slot are configured as uplink symbols, the quantity m of the symbols represents that m continuous symbols counting in reverse from one symbol before a first uplink symbol in the slot are not used for the sidelink communication; or when a part of symbols in the slot are configured as flexible symbols, the quantity m of the symbols represents that m continuous symbols beginning with a first flexible symbol in the slot are not used for the sidelink communication; or m continuous symbols counting in reverse from a last flexible symbol are not used for the sidelink communication.

One slot in the sidelink resource pool used for the sidelink communication is taken as an example, manners for indicating the position of the symbol(s) used for the sidelink communication in one slot include, but are not limited to, as follows.

A first manner: in one slot, the quantity n of the sidelink symbols used for the sidelink communication is indicated.

A second manner: in one slot, a symbol used for the sidelink communication is indicated based on the slot format indication (SFI).

A third manner: in one slot, a quantity n of symbols used for the sidelink communication and the starting symbol #k used for the sidelink communication are indicated.

A fourth manner: in one slot, a quantity m of symbols not used for the sidelink communication is indicated.

The above four manners for indicating available symbols used for sidelink communication in one slot are respectively described in detail below.

In the first manner: in one slot, the quantity n of the sidelink symbols used for the sidelink communication is indicated, where n is a positive integer greater than or equal to 1.

Alternatively, an indication meaning of the quantity n of the sidelink symbols may include situations described below.

In a first situation of the first manner, n continuous symbols beginning with the starting symbol (i.e., a first symbol) in the slot corresponding to the slot index are the sidelink symbols used for the sidelink communication, or n continuous symbols counting in reverse from a last symbol of the slot are the sidelink symbols used for the sidelink communication, 1≤n≤14.

In a second situation of the first manner, when a part of symbols in a slot corresponding to a certain slot index are configured as DL symbols, the indication meaning of the quantity n is that n continuous symbols beginning with a first symbol after a last DL symbol in the slot are the sidelink symbols used for the sidelink communication.

In a third situation of the first manner, when a part of symbols in a slot corresponding to a certain slot index are configured as UL symbols, the indication meaning of the quantity n is that n continuous symbols counting in reverse from a first symbol before a first UL symbol in the slot are the sidelink symbols used for the sidelink communication.

In a fourth situation of the first manner, when a part of symbols in a slot corresponding to a certain slot index are configured as flexible symbols, the indication meaning of the quantity n is that n continuous symbols beginning with a first flexible symbol in the slot are the sidelink symbols used for the sidelink communication, or that n continuous symbols counting in reverse from a last flexible symbol are the sidelink symbols used for the sidelink communication.

For the corresponding UE side, the indication meaning of the quantity n represents that n continuous symbols beginning with a starting symbol of the slot are the sidelink symbols; or n continuous symbols counting in reverse from a last symbol of the slot are the sidelink symbols;

or when a part of symbols in the slot are configured as DL symbols, the quantity n of the sidelink symbols represents that n continuous symbols beginning with a first symbol after a last DL symbol in the slot are the sidelink symbols; or when a part of symbols in the slot are configured as UL symbols, the quantity n of the sidelink symbols represents that n continuous symbols counting in reverse from a first symbol before a first UL symbol in the slot are the sidelink symbols; or when a part of symbols in the slot are configured as flexible symbols, the quantity n of the sidelink symbols represents that n continuous symbols beginning with a first flexible symbol in the slot are the sidelink symbols, or that n continuous symbols counting in reverse from a last flexible symbol are the sidelink symbols.

Alternatively, the quantity n of the sidelink symbols may be uniformly configured, that is, the value of the quantity n of the symbol in each slot is the same.

Alternatively, the quantity n of the sidelink symbols may also be independently configured for each slot, that is, values of the quantity n of the sidelink symbols in different slots may be different.

According to the embodiments of the present application, by means of different definitions of the quantity n of the sidelink symbol, the sidelink symbol configuration adaptive to a slot situation is realized, and the effect of configuring n continuous symbols used for the sidelink communication is achieved, so that the configuration of the sidelink resource has certain flexibility and adaptability.

For example, it is assumed that the base station indicates multiple slots contained in the sidelink resource pool, and indicates symbols usable for the sidelink communication in each slot, i.e., indicates a value of the quantity n of the symbols. Therefore, the UE may determine the slot for the sidelink communication from the received resource configuration, and may also determine an available symbol position according to the indicated quantity n of the symbols usable for the sidelink communication in each slot. Here, the value of the quantity n of the symbols being uniformly configured is taken as an example, and it is assumed that the quantity n of the symbols is equal to 5, then the indication meaning of the quantity n of the symbols according to different cases described above is as shown in FIG. 5.

In conjunction with FIG. 5(a) to FIG. 5(e), the slanted shaded small squares represent DL symbols configured in the cellular link resource, the transverse shaded small squares represent UL symbols configured in the cellular link resource, the blank small squares represent flexible symbols configured in the cellular link resource, and the snowflake dot shaded small squares represent the sidelink symbols used for the sidelink communication. For the indication meaning of the quantity n of the symbols in the first situation, n=5 represents that n continuous symbols beginning with a starting symbol of the slot are used for the sidelink communication, as shown in FIG. 5(a); or n continuous symbols beginning with an ending symbol are used for the sidelink communication, as shown in FIG. 5(b). Similarly, according to the indication meaning of the quantity n of the symbols in the second situation, the symbols used for the sidelink communication are as shown in FIG. 5(c); according to the indication meaning of the quantity n of the symbols in the third situation, the symbols used for the sidelink communication are as shown in FIG. 5(d); and according to the indication meaning of the quantity n of the symbols in the fourth situation, the symbols used for the sidelink communication are as shown in FIG. 5(e).

In the second manner: in one slot, the symbol used for the sidelink communication is indicated based on the SFI.

In an NR system, an SFI list for indicating the configuration of DL/X/UL symbols in one slot is defined, the SFI list contains multiple SFI indexes, and each SFI index corresponds to a fixed DL/X/UL configuration, which indicates symbol positions of three symbol types in one slot.

An example of the SFI list is shown as in table 1.

TABLE 1

| Index | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| 0 | D | D | D | D | D | D | D | D | D | D | D | D | D | D |
| 1 | U | U | U | U | U | U | U | U | U | U | U | U | U | U |
| 2 | X | X | X | X | X | X | X | X | X | X | X | X | X | X |
| 3 | D | D | D | D | D | D | D | D | D | D | D | D | D | X |
| 4 | D | D | D | D | D | D | D | D | D | D | D | D | X | X |
| 5 | D | D | D | D | D | D | D | D | D | D | D | X | X | X |
| 6 | D | D | D | D | D | D | D | D | D | D | X | X | X | X |
| 7 | D | D | D | D | D | D | D | D | D | X | X | X | X | X |
| 8 | X | X | X | X | X | X | X | X | X | X | X | X | X | U |
| 9 | X | X | X | X | X | X | X | X | X | X | X | X | U | U |
| 10 | X | U | U | U | U | U | U | U | U | U | U | U | U | U |
| 11 | X | X | U | U | U | U | U | U | U | U | U | U | U | U |
| 12 | X | X | X | U | U | U | U | U | U | U | U | U | U | U |
| 13 | X | X | X | X | U | U | U | U | U | U | U | U | U | U |
| 14 | X | X | X | X | X | U | U | U | U | U | U | U | U | U |
| 15 | X | X | X | X | X | X | U | U | U | U | U | U | U | U |
| 16 | D | X | X | X | X | X | X | X | X | X | X | X | X | X |
| 17 | D | D | X | X | X | X | X | X | X | X | X | X | X | X |
| 18 | D | D | D | X | X | X | X | X | X | X | X | X | X | X |
| 19 | D | X | X | X | X | X | X | X | X | X | X | X | X | U |
| 20 | D | D | X | X | X | X | X | X | X | X | X | X | X | U |
| 21 | D | D | D | X | X | X | X | X | X | X | X | X | X | U |
| 22 | D | X | X | X | X | X | X | X | X | X | X | X | U | U |
| 23 | D | D | X | X | X | X | X | X | X | X | X | X | U | U |
| 24 | D | D | D | X | X | X | X | X | X | X | X | X | U | U |
| 25 | D | X | X | X | X | X | X | X | X | X | X | U | U | U |
| 26 | D | D | X | X | X | X | X | X | X | X | X | U | U | U |
| 27 | D | D | D | X | X | X | X | X | X | X | X | U | U | U |
| 28 | D | D | D | D | D | D | D | D | D | D | D | D | X | U |
| 29 | D | D | D | D | D | D | D | D | D | D | D | X | X | U |
| 30 | D | D | D | D | D | D | D | D | D | D | X | X | X | U |
| 31 | D | D | D | D | D | D | D | D | D | D | D | X | U | U |
| 32 | D | D | D | D | D | D | D | D | D | X | X | X | u | u |
| 33 | D | D | D | D | D | D | D | D | D | X | X | X | u | u |

TABLE 1-continued

| Index | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| 34 | D | X | U | U | U | U | U | U | U | U | U | U | U | U |
| 35 | D | D | X | U | U | U | U | U | U | U | U | U | U | U |
| 36 | D | D | D | X | U | U | U | U | U | U | U | U | U | U |
| 37 | D | X | X | U | U | U | U | U | U | U | U | U | U | U |
| 38 | D | D | X | X | U | U | U | U | U | U | U | U | U | U |
| 39 | D | D | D | X | X | U | U | U | U | U | U | U | U | U |
| 40 | D | X | X | X | U | U | U | U | U | U | U | U | U | U |
| 41 | D | D | X | X | X | U | U | U | U | U | U | U | U | U |
| 42 | D | D | D | X | X | X | U | U | U | U | U | U | U | U |
| 43 | D | D | D | D | D | D | D | D | D | X | X | X | X | U |
| 44 | D | D | D | D | D | D | X | X | X | X | X | X | U | U |
| 45 | D | D | D | D | D | D | X | X | U | U | U | U | U | U |
| 46 | D | D | D | D | D | D | X | D | D | D | D | D | D | X |
| 47 | D | D | D | D | X | X | D | D | D | D | D | X | X |   |
| 48 | D | D | X | X | X | X | D | D | X | X | X | X | X |   |
| 49 | D | X | X | X | X | X | D | X | X | X | X | X | X |   |
| 50 | X | U | U | U | U | U | X | U | U | U | U | U | U | U |
| 51 | X | X | U | U | U | U | X | X | U | U | U | U | U | U |
| 52 | X | X | X | U | U | U | X | X | X | U | U | U | U | U |
| 53 | X | X | X | X | U | U | X | X | X | X | U | U | U | U |
| 54 | D | D | D | D | X | U | D | D | D | D | D | X | U |   |
| 55 | D | D | X | U | U | U | D | D | X | U | U | U | U | U |
| 56 | D | X | U | U | U | U | D | X | U | U | U | U | U | U |
| 57 | D | D | D | X | X | U | D | D | D | X | X | U | U |   |
| 58 | D | D | X | X | U | U | D | D | X | X | U | U | U | U |
| 59 | D | X | X | U | U | U | D | X | X | U | U | U | U | U |
| 60 | D | X | X | X | X | U | D | X | X | X | X | U | U |   |
| 61 | D | D | X | X | X | U | D | D | X | X | X | X | U |   |
| 62-255 |   |   |   |   |   | Reserved |   |   |   |   |   |   |   |   |

In the present application, one of the symbol types may be defined for indicating the sidelink symbols by using the SFI, and this manner herein is referred to as the sidelink SFI.

Alternatively, following situations may be adopted to indicate the sidelink SFI.

In a first situation of the second manner, a symbol, which is a symbol of a preconfigured symbol type (e.g., the DL symbol, the UL symbol, or the flexible symbol) in a slot indicated in the sidelink SFI to be used for the sidelink communication, is served as the sidelink symbol.

In a second situation of the second manner, a symbol, which is both the indicated first symbol type corresponding to the slot index in the sidelink SFI and the second symbol type in a same slot on the system cellular link, is served as the sidelink symbol used for the sidelink communication.

Alternatively, the first symbol type is predefined by a system and is a designated symbol type in the SFI used for indicating the sidelink resource; and the second symbol type is predefined by the system or is a designated symbol type indicated by a network side configuration in a cellular link resource configuration.

For the corresponding UE side, the method includes a step described below, the UE determines that in the slot corresponding to the SFI, the sidelink symbol is a symbol indicated to be a preconfigured symbol type according to the SFI; or in a slot corresponding to the SFI, the UE serves a symbol, which is both indicated as a first symbol type according to the slot format indication (SFI) and configured as a second symbol type on the cellular link, as the sidelink symbol.

Alternatively, for the first situation of the second manner:
the system may predefine to use any symbol type in the sidelink SFI indication for indicating the configured sidelink symbols in the sidelink resource configuration. For example, the UL symbol in the sidelink SFI being indicated as the sidelink symbol is taken as an example, which represents that in the resource configuration indicated by the base station, in the slot symbol structure corresponding to the indicated sidelink SFI index, the symbol defined as the UL symbol is served as the sidelink symbol.

For example, it is assumed that the base station indicates multiple slots contained in the sidelink resource pool, and indicates a symbol usable for the sidelink in each slot, that is, indicates a sidelink SFI index. Then, the UE may determine slots contained in the indicated sidelink resource pool from the received resource configuration, and may also determine an available symbol position according to the indicated sidelink SFI index. The sidelink SFI index may be configured uniformly, that is, a same SFI index is used for each slot, or the sidelink SFI index may be configured independently for each slot, that is, the SFI index on different slots may be different. Here, the unified configuration of the sidelink SFI index is taken as an example, and it is assumed that the system predefines the DL symbol in the sidelink SFI being indicated as the sidelink symbol, and SFI index=18 (as shown in table 1) is taken as an example, it represents that first three symbols in a slot with the SFI index configured as 18 are the sidelink symbols, as shown by the snowflake dot shaded small squares in FIG. 6(a); when the system predefines that the UL symbol in the sidelink SFI is indicated as the sidelink symbol, and SFI index=24 (as shown in table 1) is taken as an example, it represents that last two symbols in a slot with the SFI index configured as 24 are the sidelink symbols, as shown by the snowflake dot shaded small squares in FIG. 6(b); when the system predefines that the flexible symbol in the sidelink SFI is indicated as the sidelink symbol, SFI index=42 (as shown in table 1) is taken as an example, it represents that 4th, 5th, and 6th symbols in a slot with the SFI index configured as 42 are the sidelink symbols, as shown by the snowflake dot shaded small squares in FIG. 6(c).

Alternatively, for a second situation in the second manner: on the one hand, the system predefines a certain symbol type of the sidelink SFI as the first symbol type; on the other hand, the system predefines or configures and indicates to determine a certain symbol type in the cellular link resource configuration being a second symbol type. The certain symbol type may be the DL symbol, the UL symbol, or the flexible symbol, and the first symbol type and the second symbol type may be a same symbol type, or may be different symbol types. Alternatively, any one or more of following situations are included, as shown in table 2.

TABLE 2

|  | Second symbol type | | |
|---|---|---|---|
| First symbol type | Downlink symbol (DL symbol) | Flexible symbol | Uplink symbol (UL symbol) |
| Downlink symbol (DL symbol) | Option 1-1 | Option 1-2 | Option 1-3 |
| Flexible symbol | Option 2-1 | Option 2-2 | Option 2-3 |
| Uplink symbol (UL symbol) | Option 3-1 | Option 3-2 | Option 3-3 |

The indication meaning of the second situation in the second manner includes that on the sidelink slot, when the first symbol type indicated in the sidelink SFI and the second symbol type indicated by the cellular link configuration in the same slot have an overlapped symbol, the overlapped symbol is served as the resources used for the sidelink communication. The combination option 3-2 in the table is taken as an example, i.e., the first symbol type is the flexible symbol and the second symbol type is the UL symbol, at this time, it represents that when the flexible symbol indicated by the sidelink SFI overlaps with the UL symbol in the cellular link resource configuration on the same slot, the overlapped symbol is the sidelink time domain resource. For example, it is assumed that the UE obtains the resource configuration in the cellular link from the base station, which indicates that first 10 symbols in a slot #n are the flexible symbols, last 4 symbols are the UL symbols, first 6 symbols in a slot #n+1 are the flexible symbols, and next 8 symbols are the UL symbols. Moreover, the UE obtains a sidelink SFI indication from the sidelink resource configuration signaling, i.e., SFI index=24 (as shown in table 1) is indicated, and the sidelink SFI is uniformly indicated, i.e., it is valid for all sidelink slots.

Then, as shown in FIG. 7, in the slot #n, symbols in which the first symbol type overlaps with the second symbol type include symbol #10 and symbol #11; in the slot #n+1, the overlapped symbols include symbol #6, symbol #7, symbol #8, symbol #9, symbol #10 and symbol #11, and these overlapped symbols are the resources used for the sidelink communication. In FIG. 7, the transverse shaded small squares represent the uplink symbols indicated by the cellular link configuration, the snowflake dot shaded small squares represent the sidelink symbols, and the white small squares represent the flexible symbols indicated by the cellular link configuration.

The embodiments of the present disclosure provides a more flexible indication effect of the sidelink time domain symbol configuration by predefining different combinations of the first symbol type and the second symbol type.

In the second manner of indicating the position of the symbol used for the sidelink communication in the slot, the SFI index in the NR system is adopted to indicate the position of the symbol, actually used for the sidelink communication, in the slot contained in the sidelink resource pool, in this way, on one hand, the indication overhead may be reduced, and on the other hand, a more flexible indication effect is achieved in combination with the existing resource configuration of the cellular link. It should be noted that the meaning of the first situation in the second manner described above or the meaning of the second situation in the second manner described above is used herein to indicate the configuration and indication of the sidelink resources by using the SFI, which is different from the indication meaning of the SFI for indicating the cellular link UE in the cellular communication.

Alternatively, in the second manner, a manner for determining the sidelink symbols based on the SFI indication further includes any one or more combinations of:
when the sidelink symbols indicated by the SFI are DL symbols of the cellular link indicated by the network side, such as a base station, the sidelink symbols indicated by the SFI are invalid;
when the sidelink symbols indicated by the SFI are UL symbols of the cellular link indicated by the network side, such as the base station, the sidelink symbols indicated by the SFI are invalid;
when the sidelink symbols indicated by the SFI are UL symbols of the cellular link indicated by the network side, such as the base station, and the UL symbols schedule a UE to perform an uplink transmission on the cellular link, the sidelink symbols indicated by the SFI are invalid; or
when the sidelink symbols indicated by the SFI are UL symbols of the cellular link indicated by the network side, such as the base station, and the UL symbols do not schedule the UE to perform the uplink transmission on the cellular link, the sidelink symbols indicated by the SFI are usable for the sidelink communication.

For the corresponding UE side, the method further includes steps describe below.
When the sidelink symbols indicated by the SFI are the DL symbols of the cellular link indicated by the network side, the method further includes that:
the UE determines that the sidelink symbols indicated by the SFI are invalid;
when the sidelink symbols indicated by the SFI are the UL symbols of the cellular link indicated by the network side, the method further includes that:
the UE determines that the sidelink symbols indicated by the SFI are invalid;
when the sidelink symbols indicated by the SFI are the UL symbols of the cellular link indicated by the network side, and the UL symbols schedule the UE to perform the uplink transmission on the cellular link, the method further includes that:
the UE determines that the sidelink symbols indicated by the SFI are invalid;
when the sidelink symbols indicated by the SFI are the UL symbols of the cellular link indicated by the network side, and the UL symbols do not schedule the UE to perform the cellular link uplink transmission, the method further includes that:
the UE determines that the sidelink symbols indicated by the SFI are usable for the sidelink communication.

In the third manner: in one slot, the quantity n of the sidelink symbol(s) used for the sidelink communication and the starting symbol #k used for the sidelink communication are indicated.

For the corresponding UE side, the step in which the UE determines the sidelink symbols includes steps described below. An indication of the quantity n of the sidelink symbols in a slot and the starting symbol #k is obtained from the resource configuration of the sidelink resource pool; and the UE determines that n continuous symbols beginning with the symbol #k in a slot are the sidelink symbols.

Alternatively, an indication meaning of the quantity n of the sidelink symbols and the starting symbol #k may include that:
n continuous symbols beginning with the symbol #k in a slot corresponding to the slot index are the sidelink symbols used for the sidelink communication, that is, n continuous symbols beginning with the symbol #k in the slot are indicated as symbols in the sidelink resource pool. #k is a sequential serial number of a starting symbol in a slot.

For example, it is assumed that the base station indicates multiple slots contained in the sidelink resource pool, and indicates symbols usable for the sidelink communication in each slot, that is, indicates the value of the quantity n of the symbol and a value of the starting symbol #k. In this way, after receiving the resource configuration, the UE may determine the slots contained in the indicated sidelink resource pool, and determines the available symbol position in a slot according to the indicated quantity n of the symbol and the starting symbol #k. In this embodiment, it is assumed that n=4 and k=5, then the sidelink symbol indicated in the corresponding slot is that:
if the symbols in the slot are numbered from 0, then k=5 means beginning with symbol #5. At this time, the symbol #5, symbol #6, symbol #7, and symbol #8 are the sidelink symbols, as shown by the snowflake dot shaded small squares in FIG. 8(*a*); or, if the symbols in the slot are numbered beginning with 1, then k=5 means beginning with the symbol #5, at this time, the symbol #5, symbol #6, symbol #7 and symbol #8 are the sidelink symbols, as shown by the snowflake dot shaded small squares in FIG. 8(*b*).

In the fourth manner: in one slot, the quantity m of the symbols which are not used for the sidelink communication is indicated.

Alternatively, an indication meaning of the quantity m of the symbols may include situations described below.

In a first situation of the fourth manner, m continuous symbols beginning with the starting symbol (i.e., the first symbol) in the slot corresponding to the slot index are not used for the sidelink communication, or m continuous symbols counting in reverse from a last symbol in the slot are not used for the sidelink communication, and 0≤n≤14.

In a second situation of the fourth manner, when a part of symbols in a slot corresponding to a certain slot index are configured as DL symbols, the indication meaning of m is that m continuous symbols beginning with a first symbol after a last DL symbol in the slot are not used for the sidelink communication, that is, except for the DL symbols and the indicated m symbols, remaining symbols may be used for the sidelink communication.

In a third situation of the fourth manner, when a part of symbols in a slot corresponding to a certain slot index are configured as UL symbols, the indication meaning of m is that m continuous symbols counting in reverse from a first symbol before a first UL symbol in the slot are not used for the sidelink communication, that is, except for the UL symbols and the indicated m symbols, remaining symbols may be used for the sidelink communication.

In a fourth situation of the fourth manner, when a part of symbols in a slot corresponding to a certain slot index are configured as flexible symbols, the indication meaning of m is that m continuous symbols beginning with a first flexible symbol in the slot are not used for the sidelink communication, that is, except for the indicated m symbols, remaining flexible symbols may be used for the sidelink communication; or that m continuous symbols counting in reverse from a last flexible symbol are not used for the sidelink communication, that is, except for the indicated m symbols, remaining flexible symbols may be used for the sidelink communication.

Alternatively, the quantity m of the symbols may be uniformly configured, that is, the value of the quantity m of symbols in each slot is the same.

Alternatively, the quantity m of the symbols may also be independently configured for each slot, that is, values of the quantity m of the symbols in different slots may be different.

For the UE side, the step in which the UE determines the sidelink symbols includes steps described below, an indication of the quantity m of the symbols in a slot, which are not used for the sidelink communication, is obtained from the resource configuration of the sidelink resource pool; and the sidelink symbol is determined according to the obtained quantity m of the symbols, where the quantity m of the symbols is a non-negative integer.

According to the embodiments of the present disclosure, by means of different definitions of the quantity m of the symbols, the sidelink symbol configuration adaptive to a slot situation is realized, and the effect of configuring m continuous symbols not used for the sidelink communication is achieved, so that the configuration of the sidelink resource has flexibility and adaptability.

Alternatively, the method for configuring the resources in the present application further includes a step that the network side indicates trigger indication information, and the trigger indication information is used for indicating that the configured time domain resources of the sidelink resource pool are triggered or not triggered.

For the corresponding UE side, the method further includes that the UE determines whether to trigger or not trigger the time domain resources of the configured sidelink resource pool according to the trigger indication information.

Alternatively, the network side indicates, through the trigger indication information, that use of all or a part of resources in the sidelink resource pool is triggered or not triggered.

Alternatively, based on the configured sidelink resource pool, a meaning indicated by the trigger information may include at least one of that:

a resource in the sidelink resource pool is available or unavailable within a time range, where a value of the time range is predefined by the system or indicated by the network side;

a resource in the sidelink resource pool is available or unavailable after a time interval, where a value of the time interval is predefined by the system or indicated by the network side;

a resource in the sidelink resource pool is available or unavailable in a current slot; or a sidelink trigger SFI, which indicates that a symbol, which corresponds to a third symbol type indicated in the sidelink trigger SFI and is contained in the sidelink resource pool, is indicated as an available or unavailable sidelink resource. The third symbol type is predefined by the system or configured by the network side, and the third symbol type is any one of the DL symbol, the UL symbol, or the flexible symbol.

Alternatively, the method further includes a step, when the network side does not send the trigger indication information, or the trigger indication information indicates that the corresponding resource is unavailable, it represents that the corresponding resource in the sidelink resource pool is not usable for carrying a sidelink signal.

For the corresponding UE side, the method includes that: the step in which the UE determines that the configured time domain resources of the sidelink resource pool are triggered or not triggered includes at least one of:

the UE determines according to the trigger indication information that a resource in the sidelink resource pool within a time range is available or unavailable, where a value of the time range is predefined by the system or indicated by the network side;

the UE determines according to the trigger indication information that a resource in the sidelink resource pool after a time interval is available or unavailable, where a value of the time interval is predefined by the system or indicated by the network side;

the UE determines according to the trigger indication information that a resource in the sidelink resource pool in a current slot is available or unavailable; or the UE determines according to the trigger indication information that a symbol, which corresponds to a third symbol type indicated in the sidelink trigger slot format indication (SFI) and is contained in the sidelink resource pool, is an available or unavailable sidelink resource; where the third symbol type is predefined by the system or configured by the network side, and the third symbol type is any one of the DL symbol, the UL symbol or the flexible symbol.

The implementation of the trigger indication information will be described below in conjunction with examples.

In one embodiment, it is assumed that the system predefines a time range oft slots, after the UE receives the trigger indication information, resources in the configuration of the sidelink resource pool within the t slots are valid and may be used for carrying a sidelink signal. In this embodiment, it is assumed that the configuration of the sidelink resource pool predefined by the system is shown as in FIG. 9(a), and the snowflake dot shading represents a sidelink resource usable for the sidelink communication and configured by the sidelink resource pool. Whether the resource in the sidelink resource pool is indeed available depends on the indication of the trigger information. In this embodiment, when the UE receives the trigger indication information in the slot #n, which indicates available, then resources in the sidelink resource pool in t slots beginning with the slot #n+1 are available, that is, it may be indeed used for sending or receiving the sidelink signal, as shown by the vertical shaded part in FIG. 9(b).

Alternatively, if the UE does not receive the trigger indication information or the trigger indication information indicates that the corresponding resource is unavailable, then the corresponding resource in the sidelink resource pool is not usable for carrying the sidelink signal.

In another embodiment, it is assumed that the system predefines a time interval of t slots, resources, in the configuration of the sidelink resource pool, beginning with the t slots after the UE receives the trigger indication information are valid and may be used for carrying the sidelink signal. In this embodiment, it is assumed that the configuration of the sidelink resource pool predefined by the system is shown as in FIG. 10(a), and the snowflake dot shading represents the configured sidelink resources contained in the sidelink resource pool. Whether the resource in the sidelink resource pool is indeed available depends on the indication of the trigger indication information. In this embodiment, when the UE receives the trigger indication information in the slot #n, which indicates available, then resources in the sidelink resource pool after the slot #n+t are available, that is, which may be indeed used for sending or receiving the sidelink signal, as shown by the vertical shaded part in FIG. 10(b).

In still another embodiment, it is assumed that the system predefines the third symbol type as the flexible symbol, a symbol in an overlapped part between the flexible symbol indicated in the sidelink trigger SFI and the symbols contained in the configuration of the sidelink resource pool represents an available or unavailable resource indicated by the trigger indication information. In this embodiment, it is assumed that the configuration of the sidelink resource pool predefined by the system is shown as in FIG. 11(a), and the snowflake dot shading represents sidelink resources configured for the sidelink resource pool, which are usable for the sidelink communication, including 6 symbols in the end of the slot. Whether the resource in the sidelink resource pool is indeed available depends on the indication of the trigger indication information. In this embodiment, when the UE receives the trigger indication information, that is, it indicates that the sidelink trigger SFI is SFI index=30 (as shown in table 1), and the flexible symbols are three symbols of symbol #10, symbol #11 and symbol #12. It can be seen that overlapped symbols of the third symbol type indicated in the trigger SFI and the symbols in the sidelink resource pool in this embodiment are the symbol #10, the symbol #11 and the symbol #12, that is, these three symbols are indeed available sidelink resources, as shown by the vertical shaded part in FIG. 11(b), other symbols contained in the sidelink resource pool cannot be used for the sidelink signal transmission.

Alternatively, the method for configuring the resources in the present application further includes that the network side indicates resource configuration of the time domain resources of the sidelink resource pool through signaling.

For the corresponding UE side, the method further includes that the UE obtains the resource configuration of the time domain resources of the sidelink resource pool according to the received signaling.

Alternatively, the signaling may include but is not limited to one or more combinations of:
cell common configuration signaling;
dedicated higher layer signaling;
downlink control information (DCI) signaling;
a sidelink broadcast message; or
sidelink control indication (SCI) signaling.

Alternatively, the cell common configuration information includes, but is not limited to, one or more combinations of:
system information (SI);
a master system information block (MIB);
a system information block (SIB);
other system information (OSI); or
remain system information (RMSI).

Alternatively, the dedicated higher layer signaling may include, but is not limited to, dedicated radio resource control (RRC) signaling.

It should be noted that any one or more combinations of the above system signaling may be used in a manner for carrying the indication information of the resources used for the sidelink communication under the premise of no conflict. The UE may determine the type of the signaling to be received according to the configuration predefined by the system or on the network side, and obtains the resource configuration of the corresponding sidelink resource from the signaling.

Alternatively, the resource configuration includes one or more combinations of:
a period of a sidelink resource pool;
a list of slots contained in a sidelink resource pool;
a sidelink resource indication SFI for indicating a sidelink symbol in a sidelink resource pool;
a preconfigured symbol type in the sidelink resource indication SFI for indicating a sidelink symbol in the sidelink resource pool;
a first symbol type in the sidelink resource indication SFI for indicating a sidelink symbol in a sidelink resource pool;
a second symbol type of the cellular link;
an indication of a third symbol type in a sidelink trigger SFI triggered by a resource in a sidelink resource pool;
an indicated quantity n of the sidelink symbols in a slot contained in a sidelink resource pool;
an indicated starting symbol #k in a slot contained in a sidelink resource pool; or
a radio network temporary identifier (RNTI) used for indicating sidelink resource configuration.

An implementation of carrying the resource configuration in the system signaling for sending is described below in connection with the embodiments.

In one embodiment, the resource configuration carried in cell common configuration signaling for sending is taken as an example. Accordingly, the UE will obtain the resource configuration of the resources used for the sidelink communication according to the received cell common configuration signaling.

In a cellular communication system, the base station may perform a uniform resource configuration for UEs in the cell through the cell common configuration signaling, including the indication of time domain slots, symbol types in the slot, frequency domain RB division and the like. Since the sidelink resource pool may be shared by multiple UEs performing the sidelink communication in the cell, the resources used for the sidelink communication may carry the resource configuration by using the cell common configuration signaling. The sidelink obtains the resource configuration of the resources used for the sidelink communication according to the received cell common configuration signaling, and then receives and/or sends the sidelink signal according to the configured resource.

Alternatively, according to a rule predefined by the system, the UE obtains the resource configuration of the resources used for the sidelink communication from the common configuration signaling, and performs a corresponding reception in the signaling carrying manner.

Figure 12:
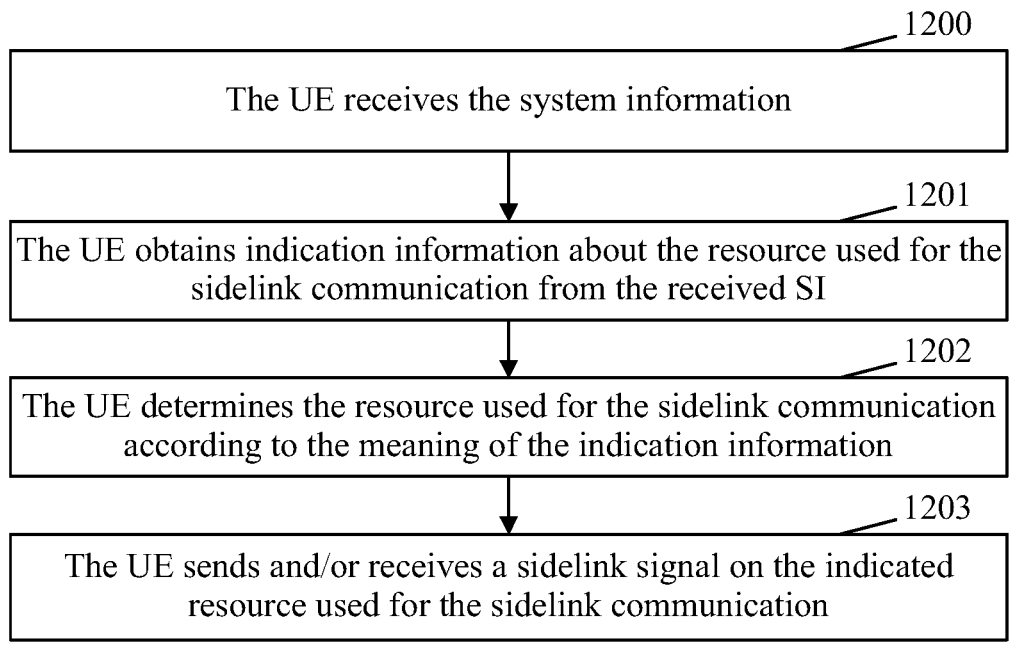
FIG. 12 is a flowchart of a first embodiment of configuring resources through system signaling in a method for configuring sidelink resources of the present application.

As shown in FIG. 12, in this embodiment, it is assumed that the resource configuration of the resource predefined by the system and used for the sidelink communication is carried by the base station through the system information (SI), and then the method includes steps described below.

In step 1200, the UE periodically receives the SI.

In step 1201, the UE obtains the indication information, such as a sidelink slot index list, a sidelink SFI, sidelink RBs, about the resources used for the sidelink communication from the received SI.

In step 1202, the UE determines the resources used for the sidelink communication according to the meaning of the indication information.

Alternatively, the method further includes steps described below.

In step 1203, the UE sends a sidelink signal on the indicated resource used for the sidelink communication, and/or receives sidelink signals of other UE.

In another embodiment, the resource configuration carried in the dedicated higher layer signaling for sending is taken as an example, and correspondingly, the UE may obtain the resource configuration of the resources used for sidelink communication according to the received dedicated higher layer signaling. In this way, the network side, such as a base station, may schedule and configure the sidelink resource pool of each UE more flexibly, so that the resource configuration efficiency is improved, and the fineness of the resource management control on the network side is improved.

Dedicated RRC signaling serving as the dedicated higher layer signaling is taken as an example, after the UE establishes a connection with the base station, the dedicated RRC signaling from the base station is received, and the resource configuration of the resources used for the sidelink communication is obtained from the dedicated RRC signaling.

Alternatively, when the RRC signaling carries the resource configuration of the resources used for the sidelink communication, one or more UEs may be divided into one group according to attributes of the UEs, and the RRC signaling configures a same resource, i.e., a same sidelink resource pool, used for the sidelink communication for sidelink UEs belonging to a same group.

Figure 13:
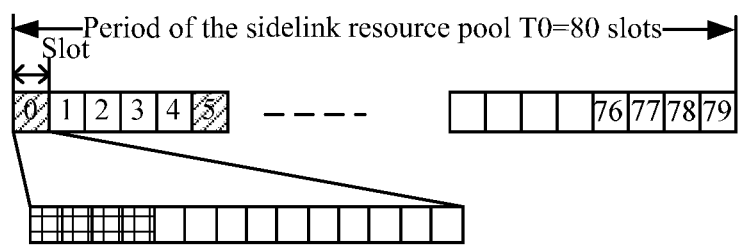
FIG. 13 is a schematic diagram of a second embodiment of configuring resources through RRC signaling in a method for configuring sidelink resources of the present application.

For example, it is assumed that the UE receives the RRC signaling from the base station, here the RRC signaling is sidelink dedicated configuration signaling, which carries the resource configuration such as a sidelink resource pool, a sidelink signal mode, a sidelink transmit and/or receive parameter. For the configuration of the sidelink resource pool, it is assumed that the indication in the RRC signaling includes a period of the sidelink resource pool and the slot index of the time domain resource configured as the sidelink resource, including one or more slots, in the period of the sidelink resource pool. Further, it is assumed that the RRC signaling further indicates the position of the symbol usable for the sidelink in each slot configured as the sidelink resource. In this embodiment, it is assumed that the UE receives the RRC signaling, analyzes the RRC signaling to obtain following configuration information: the period of the sidelink resource pool is 80 slots, the list of slot indexes contained in the sidelink resource pool is [0, 5, 10, 15, 20, 25, 30], and the symbol indication used for the sidelink communication in each sidelink slot includes that 4 symbols beginning with the starting position in each slot are used for the sidelink communication. Then the UE obtains the resource configuration of the time domain resources used for the sidelink communication, as shown in FIG. 13.

In another embodiment, the resource configuration carried in the DCI signaling for sending is taken as an example, and correspondingly, the UE obtains the resource configuration of the resources used for the sidelink communication according to the received DCI signaling. After the UE establishes a connection with the base station, the base station configures a dedicated radio network temporary identifier (RNTI), referred to as a sidelink RNTI (SL-RNTI), for the UE to perform the sidelink communication. In this way, with the SL-RNTI as an identifier, the UE receives the DCI signaling related to sidelink control and obtains the indication information related to the resources used for the sidelink communication therefrom.

Figure 14:
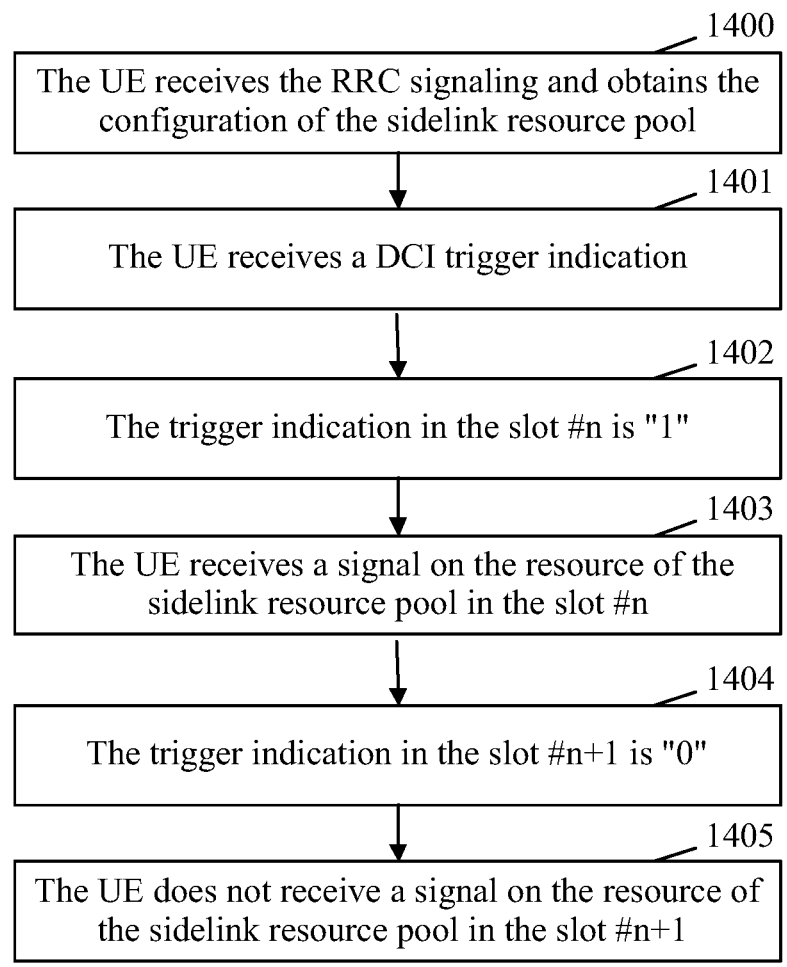
FIG. 14 is a flowchart of a third embodiment of configuring resources through RRC signaling in a method for configuring sidelink resources of the present application.

For example, it is assumed that the UE receives the RRC configuration signaling from the base station, indicates the configuration of the sidelink resource pool; the UE also needs to receive sidelink resource trigger signaling, which is used for triggering to indicate whether the resource in the sidelink resource pool configured in the RRC signaling is indeed available, according to the SL-RNTI. It is assumed that the trigger signaling indicates whether the sidelink resource in a current slot is triggered to be available or not, for example, whether the resource of the sidelink resource pool in the current slot is available is indicated by 1 bit in the DCI identified by the SL-RNTI, when the indication bit is "1", it represents that the trigger indication is activated, and the resource of the resource pool is a valid resource and may be used for carrying the sidelink signal. As shown in FIG. 14, the method includes steps described below.

In step 1400, the UE receives the RRC signaling and obtains the configuration of the sidelink resource pool from the RRC signaling.

In step 1401, in this embodiment, it is assumed that the UE receives a DCI indication from the base station in the slot #n.

In step 1402, in this embodiment, it is assumed that the trigger indication bit is determined to be "1", it represents that the sidelink resource in the current slot is available.

In step 1403, the UE receives a sidelink signal on the corresponding sidelink resource.

In step 1404, the UE receives a DCI indication from the base station in the slot #n+1, and the trigger indication bit is "0", it represents that the sidelink resource in the current slot is unavailable.

In step 1405, the UE does not receive the sidelink signal in the slot #n+1.

In still another embodiment, the resource configuration information carried in the sidelink broadcast message for sending is taken as an example, and correspondingly, the UE may obtain the resource configuration of the resources used for the sidelink communication according to the received sidelink broadcast message. The sidelink broadcast message is sent by a sidelink node, and the sidelink node includes, but is not limited to, a sidelink UE, a sidelink relay node and the like.

The sidelink broadcast message may include resource configuration in any one or more combinations of indication manners in this application, which are used for the configuration of the sidelink resource pool, and the resource configuration is used for indicating a related configuration of the sidelink resource pool to surrounding sidelink UEs.

Under a scenario that the configuration of cellular network information is invalid, for example, no cellular network coverage exists, or the sidelink dedicated resource exists, the UE cannot obtain the configuration of the sidelink resource pool from the network side, and at this time, based on transmissions between sidelink nodes, the configuration information of the sidelink resource pool may be shared to achieve the effective sidelink resource configuration effect. For example, it is assumed that the UE obtains, from the received sidelink control indication (SCI) message, the resource configuration of the resources used for the sidelink communication, i.e., the configuration information related to the sidelink resource pool. The SCI is sent by a sidelink node. Unlike the sidelink broadcast message, the SCI message is point-to-point unicast information, for example, the SCI message is sent to a corresponding receiving UE from an SCI transmitting UE, and the SCI message may include the resource configuration of any one or more combinations of the indication manners in this application, which are used for the configuration of the sidelink resource pool, and the resource configuration is used for indicating the configuration of the sidelink resource pool related to the receiving UE. The SCI message is used to indicate the related configuration information of the sidelink resource pool, which achieves a more flexible resource configuration effect.

It should be noted that, under the premise of no conflict, any one or more combinations of the signaling carrying manners described above may be adopted in the present application for the signaling carrying mode in which the resource configuration, used for indicating that more than one slot is the time domain resources used for the sidelink communication, in carried in the system signaling and for indicating the resource configuration of the time domain resources used for the sidelink communication. For example, carrying by the system information signaling is adopted to indicate a symbol configuration in the indicated sidelink slot through a combination use; as another example, the indicated sidelink SFI index may adopt the RRC signaling carrying and the like, and other situations may be similarly combined for use, which will not be repeated here.

Alternatively, the method for configuring the resources in the present application further includes that the network side indicates a frequency domain resource contained in the sidelink resource pool, so that the indication for the configuration of the sidelink resource pool in a next generation communication system, such as a 5G system, is realized.

The present application provides a computer-readable storage medium. The computer-readable storage medium stores a computer-executable instruction, which is used for performing the method for configuring the resources of any one of the embodiments.

The present application provides a device for configuring resources. The device includes a processor, a memory, and a computer program stored on the memory and executable on the processor to implement steps of the method for configuring the resources of any one of the embodiments.

Figure 15:
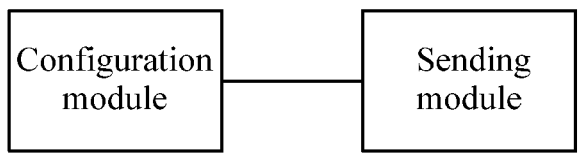
FIG. 15 is a schematic diagram of a composition structure of a device for configuring sidelink resources in the present application.

FIG. 15 is a schematic diagram of a composition structure of a device for configuring sidelink resources in the present application, as shown in FIG. 15, the device includes a configuration module and a sending module.

The configuration module is configured to configure time domain resources of a sidelink resource pool used for a sidelink communication, where the sidelink resource pool includes at least one slot in time domain, and at least one time domain symbol in one slot is used for the sidelink communication; and the time domain resources of the sidelink resource pool are dedicated resources of the sidelink communication, or resources shared by the sidelink communication and a cellular link.

The sending module is configured to send, to a user equipment, resource configuration of the time domain resources of the sidelink resource pool used for the sidelink communication.

Alternatively, the configuration module is configured to configure a slot index within a resource indication period; where at least one time domain symbol in a slot corresponding to the slot index is indicated as the time domain resources of the sidelink resource pool.

Alternatively, the configuration module is configured to indicate slots within a resource indication period by using a bitmap, where the time domain resources of the sidelink resource pool are at least one time domain symbol in a corresponding slot indicated by a valid bit of the bitmap.

Alternatively, the configuration module is further configured to indicate sidelink symbols used for the sidelink communication in a slot contained in the sidelink resource pool; or predefine sidelink symbols in a slot contained in the sidelink resource pool, which includes that a quantity of the sidelink symbols and a position of the sidelink symbols in the slot are predefined.

Alternatively, the step in which the sidelink symbols are indicated in the slot contained in the sidelink resource pool includes one of that:

a quantity n of the sidelink symbols in the slot is indicated, where n is a positive integer;
the sidelink symbols are indicated based on a slot format indication (SFI);
the quantity n of the sidelink symbols in the slot and a starting symbol #k are indicated; or
a quantity m of symbols in the slot, which are not used for the sidelink communication, is indicated, where the quantity m of the symbols is a non-negative integer.

Alternatively, the configuration module is further configured to indicate trigger indication information, and the trigger indication information is used for indicating that the configured time domain resources of the sidelink resource pool are triggered or not triggered.

Alternatively, the sending module is configured to send resource configuration for indicating the time domain resources of the sidelink resource pool through signaling.

Figure 16:
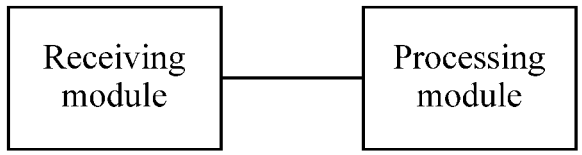
FIG. 16 is a schematic diagram of a composition structure of another device for configuring sidelink resources in the present application.

FIG. 16 is a schematic diagram of a composition structure of another device for configuring a sidelink resource in the present application, as shown in FIG. 16, the device includes a receiving module and a processing module.

The receiving module is configured to receive resource configuration of time domain resources of a sidelink resource pool used for a sidelink communication, where the sidelink resource pool includes at least one slot in time domain, and at least one time domain symbol in a slot is used for the sidelink communication; and the time domain resources of the sidelink resource pool are dedicated resources of the sidelink communication, or resources shared by the sidelink communication and a cellular link.

The processing module is configured to determine the time domain resources used for the sidelink communication according to the resource configuration.

Alternatively, the step in which the time domain resources of the sidelink resource pool are indicated includes that a slot index within a resource indication period is indicated; where the time domain resources of the sidelink resource pool are at least one time domain symbol in a slot corresponding to the indicated slot index; or that slots within a resource indication period are indicated by using a bitmap, where the time domain resources of the sidelink resource pool are at least one time domain symbol in a corresponding slot indicated by a valid bit of the bitmap.

Accordingly, the processing module is configured to: determine according to the slot index indicated in the resource configuration that the time domain resources of the sidelink resource pool are at least one time domain symbol in a slot corresponding to the slot index within the resource indication period; or determine according to the bitmap indicated in the resource configuration that the time domain resources of the sidelink resource pool are at least one time domain symbol in a corresponding slot indicated by a valid bit of the bitmap within the resource indication period.

Alternatively, the processing module is further configured to determine, according to the resource configuration, the sidelink symbols used for the sidelink communication in the slot contained in the sidelink resource pool; or determine, according to sidelink symbols predefined in the slot contained in the sidelink resource pool, a predefined quantity of the sidelink symbols and a position of the sidelink symbols in the slot.

Alternatively, the step in which the sidelink symbols contained in the sidelink resource pool are determined includes one of that:
the quantity n of the sidelink symbols in the slot is determined, where n is a positive integer;
the sidelink symbols are indicated based on a slot format indication (SFI);
the quantity n of the sidelink symbols in the slot and a starting symbol #k in the slot are determined; or
a quantity m of symbols in the slot, which are not used for the sidelink communication, is determined, where the quantity m of the symbols is a non-negative integer.

Alternatively, the processing module is further configured to determine according to trigger indication information that the time domain resources of the configured sidelink resource pool are triggered or not triggered Alternatively, the receiving module is configured to receive the resource configuration of the time domain resources of the sidelink resource pool according to the received signaling.

The present application further provides a system for configuring resources. The system includes a network side and a user equipment, the network side includes any device as shown in FIG. 15, and the user equipment includes any device as shown in FIG. 16.

According to the technical scheme of the present application, the network side indicates that at least one slot is the time domain resources used for the sidelink communication. Through this application, a guarantee for implementing the sidelink communication in a next generation communication system is provided.

What is claimed is:

1. A method for configuring sidelink resources, comprising:
    indicating, by a network side, time domain resources of a sidelink resource pool used for sidelink communication, wherein the sidelink resource pool comprises at least one slot in time domain, and time domain symbols in the at least one slot are used for the sidelink communication; and
    wherein the time domain resources of the sidelink resource pool are dedicated resources of the sidelink communication;
    wherein indicating the time domain resources of the sidelink resource pool used for the sidelink communication comprises: indicating sidelink symbols for the sidelink communication in a slot contained in the sidelink resource pool, wherein indicating the sidelink symbols in the slot contained in the sidelink resource pool comprises: indicating a quantity n of the sidelink symbols and a starting symbol #k in the slot, wherein n is a positive integer; and
    wherein indicating the quantity n of the sidelink symbols and the starting symbol #k comprises: n continuous symbols beginning with the starting symbol #k in the slot are the sidelink symbols.

2. The method of claim 1, wherein indicating the time domain resources of the sidelink resource pool used for the sidelink communication comprises:
    indicating slots within a resource indication period by using a bitmap; wherein a corresponding slot indicated by a valid bit of the bitmap is a slot belonging to the sidelink resource pool, and symbols in the corresponding slot are the time domain resources of the sidelink resource pool.

3. The method of claim 2, wherein the resource indication period comprises: a repetition time interval of indicated configuration of the sidelink resource pool.

4. The method of claim 1, wherein the quantity n of the sidelink symbols represents one of that: n continuous symbols beginning with a starting symbol of the slot are the sidelink symbols; or n continuous symbols counting in reverse from a last symbol of a slot are the sidelink symbols; or
    in a case where a part of symbols in the slot are configured as downlink symbols, the quantity n of the sidelink symbols represents that n continuous symbols beginning with a first symbol after a last downlink symbol in the slot are the sidelink symbols; or
    in a case where a part of symbols in the slot are configured as uplink symbols, the quantity n of the sidelink symbols represents that n continuous symbols counting in reverse from one symbol before a first uplink symbol in the slot are the sidelink symbols; or
    in a case where a part of symbols in the slot are configured as flexible symbols, the quantity n of the sidelink symbols represents one of that: n continuous symbols beginning with a first flexible symbol in a slot are used for the sidelink communication, or n continuous symbols counting in reverse from a last flexible symbol are the sidelink symbols.

5. The method of claim 1, wherein the starting symbol #k is a sequential serial number of the starting symbol in the slot.

6. The method of claim 1, wherein values of the quantity n of the sidelink symbols in different slots are same or different.

7. The method of claim 1, further comprising:
    indicating, by the network side through signaling, resource configuration of the time domain resources of the sidelink resource pool; wherein the signaling comprises at least one of:
    cell common configuration signaling;
    dedicated higher layer signaling;
    a sidelink broadcast message; or
    sidelink control indication (SCI) signaling;
    the resource configuration comprises at least one of:
    a period of the sidelink resource pool;
    a list of slots contained in the sidelink resource pool;

an indicated quantity n of sidelink symbols in a slot contained in the sidelink resource pool; or an indicated starting symbol #k of the sidelink symbols in the slot contained in the sidelink resource pool.

8. The method of claim 7, wherein the cell common configuration signaling comprises at least one of:
system information (SI);
a master system information block (MIB);
a system information block (SIB);
other system information (OSI); or
remain system information (RMSI).

9. A device for configuring resources, comprising a processor, a memory, and a computer program stored on the memory and executable on the processor, wherein the computer program, when executed, implements the method for configuring the sidelink resources of claim 1.

10. A method for configuring sidelink resources, comprising:
determining, by a user equipment (UE), time domain resources of a sidelink resource pool, used for sidelink communication, according to resource configuration of the sidelink resource pool;
wherein the sidelink resource pool comprises at least one slot in time domain, and time domain symbols in the at least one slot are used for the sidelink communication; and the time domain resources of the sidelink resource pool are dedicated resources of the sidelink communication;
wherein the resource configuration of the sidelink resource pool comprises: an indication of sidelink symbols for the sidelink communication in a slot contained in the sidelink resource pool, wherein the indication of the sidelink symbols comprises an indication of a quantity n of the sidelink symbols and a starting symbol #k in the slot, and n is a positive integer; and
wherein determining, by the UE, the sidelink symbols comprises: determining, by the UE, that n continuous symbols beginning with the starting symbol #k in the slot are the sidelink symbols.

11. The method of claim 10, wherein determining, by the UE, the time domain resources of the sidelink resource pool according to the configuration indication information of the sidelink resource pool comprises:
indicating, through the resource configuration of the sidelink resource pool, slots within a resource indication period by using a bitmap, wherein a corresponding slot indicated by a valid bit of the bitmap is a slot belonging to the sidelink resource pool, and symbols in the corresponding slot are the time domain resources of the sidelink resource pool.

12. The method of claim 11, wherein the resource indication period comprises: a period of the sidelink resource pool, representing a repetition time interval of indicated configuration of the sidelink resource pool.

13. The method of claim 11,
wherein determining, by the UE, the time domain resources of the sidelink resource pool according to the resource configuration of the sidelink resource pool comprises:

determining, by the UE, that the sidelink symbols are the time domain resources used for the sidelink communication according to the indicated sidelink symbols.

14. The method of claim 10, wherein the quantity n of the sidelink symbols represents one of that: n continuous symbols beginning with a starting symbol of the slot are the sidelink symbols, or n continuous symbols counting in reverse from a last symbol of the slot are the sidelink symbols; or
in a case where a part of symbols in the slot are configured as downlink symbols, the quantity n of the sidelink symbols represents that n continuous symbols beginning with a first symbol after a last downlink symbol in the slot are the sidelink symbols;
in a case where a part of symbols in a slot are configured as uplink symbols, the quantity n of the sidelink symbols represents that n continuous symbols counting in reverse from one symbol before a first uplink symbol in the slot are the sidelink symbols; or
in a case where a part of symbols in a slot are configured as flexible symbols, the quantity n of the sidelink symbols represents that n continuous symbols beginning with a first flexible symbol in the slot are the sidelink symbols, or n continuous symbols counting in reverse from a last flexible symbol are the sidelink symbols.

15. The method of claim 10, wherein the starting symbol #k is a sequential serial number of the starting symbol in the slot.

16. The method of claim 10, further comprising:
obtaining, by the UE, resource configuration of the sidelink resource pool according to received signaling, wherein the signaling comprises at least one of:
cell common configuration signaling;
dedicated higher layer signaling;
a sidelink broadcast message; or
sidelink control indication (SCI) signaling; and
the resource configuration comprises at least one of:
a period of the sidelink resource pool;
a list of slots contained in the sidelink resource pool;
an indicated quantity n of sidelink symbols in a slot contained in the sidelink resource pool; or
an indicated starting symbol #k of the sidelink symbols in the slot contained in the sidelink resource pool.

17. The method of claim 16, wherein the cell common configuration signaling comprises at least one of:
system information (SI);
a master system information block (MIB);
a system information block (SIB);
other system information (OSI); or
remain system information (RMSI).

18. A device for configuring resources, comprising a processor, a memory, and a computer program stored on the memory and executable on the processor; wherein the computer program, when executed, implements the method for configuring the sidelink resources of claim 10.

* * * * *